(12) United States Patent
Godon et al.

(10) Patent No.: US 9,365,956 B2
(45) Date of Patent: Jun. 14, 2016

(54) FIBROUS STRUCTURE FOR A PART MADE OF COMPOSITE MATERIAL HAVING ONE OR MORE ARCHSHAPED PORTIONS

(75) Inventors: Thierry Godon, Sevran (FR); Bruno Jacques Gerard Dambrine, Le Chatelet en Brie (FR)

(73) Assignee: SNECMA, Paris (FR)

( * ) Notice: Subject to any disclaimer, the term of this patent is extended or adjusted under 35 U.S.C. 154(b) by 577 days.

(21) Appl. No.: 13/993,472

(22) PCT Filed: Dec. 5, 2011

(86) PCT No.: PCT/FR2011/052868
§ 371 (c)(1),
(2), (4) Date: Jun. 12, 2013

(87) PCT Pub. No.: WO2012/080617
PCT Pub. Date: Jun. 21, 2012

(65) Prior Publication Data
US 2013/0270389 A1 Oct. 17, 2013

(30) Foreign Application Priority Data

Dec. 13, 2010 (FR) ...................................... 10 60408

(51) Int. Cl.
*D03D 13/00* (2006.01)
*B29B 11/16* (2006.01)
(Continued)

(52) U.S. Cl.
CPC .............. *D03D 13/004* (2013.01); *B29B 11/16* (2013.01); *B29C 70/222* (2013.01); *B64D 27/00* (2013.01);
(Continued)

(58) Field of Classification Search
CPC ............. D03D 1/00; D03D 3/02; D03D 3/04; D03D 13/00; Y10T 442/20; Y10T 442/3195; Y10T 442/3301
See application file for complete search history.

(56) References Cited

U.S. PATENT DOCUMENTS 5,021,283 A * 6/1991 Takenaka ............... D03D 11/02
139/384 R
5,080,142 A 1/1992 Calamito et al.
(Continued)

FOREIGN PATENT DOCUMENTS

| EP | 0 391 745 | 10/1990 |
|---|---|---|
| FR | 2 939 129 | 6/2010 |
| FR | 2 940 167 | 6/2010 |
| JP | 5 230735 | 9/1993 |

OTHER PUBLICATIONS

U.S. Appl. No. 13/980,158, filed Sep. 6, 2013, Dambrine, et al.
(Continued)

*Primary Examiner* — Andrew Piziali
(74) *Attorney, Agent, or Firm* — Oblon, McClelland, Maier & Neustadt, L.L.P.

(57) ABSTRACT

A reinforcing fiber structure for a composite material part is woven as a single piece by multilayer weaving between plural layers of weft yarns and plural layers of warp yarns arranged in adjacent manner between two faces of the structure. The fiber structure includes at least one arcuate portion extending over one of the faces of the fiber structure, the arcuate portion including at least some of the warp yarns continuous with at least two adjacent warp yarn layers present on one of the faces of the structure. The warp yarns of the arcuate portion are of a length that is longer than the warp yarns of at least two underlying warp yarn layers of the structure. In addition, the warp yarns of the arcuate portion are not interlinked with other warp yarns of the fiber structure.

11 Claims, 15 Drawing Sheets

(51) Int. Cl.
  *B29C 70/22* (2006.01)
  *D03D 11/02* (2006.01)
  *D03D 25/00* (2006.01)
  *F01D 25/24* (2006.01)
  *B64D 27/00* (2006.01)
  *D03D 1/00* (2006.01)
  *B64D 27/26* (2006.01)

(52) U.S. Cl.
  CPC .............. *D03D 1/00* (2013.01); *D03D 11/02* (2013.01); *D03D 25/005* (2013.01); *F01D 25/24* (2013.01); *B64D 2027/262* (2013.01); *D10B 2505/02* (2013.01); *F05D 2300/603* (2013.01); *Y02T 50/672* (2013.01); *Y10T 428/24612* (2015.01)

(56) References Cited

U.S. PATENT DOCUMENTS

| | | | |
|---|---|---|---|
| 5,098,756 | A | 3/1992 | Henderson et al. |
| 5,273,080 | A * | 12/1993 | Morohashi ........... D03D 25/005 138/124 |
| 6,955,192 | B2 | 10/2005 | Matsui et al. |
| 2002/0148525 | A1 | 10/2002 | Matsui et al. |
| 2011/0308702 | A1 | 12/2011 | Serey et al. |
| 2011/0311368 | A1 | 12/2011 | Coupe et al. |

OTHER PUBLICATIONS

International Search Report Issued Mar. 21, 2012 in PCT/FR11/052868 Filed Dec. 5, 2011.

* cited by examiner

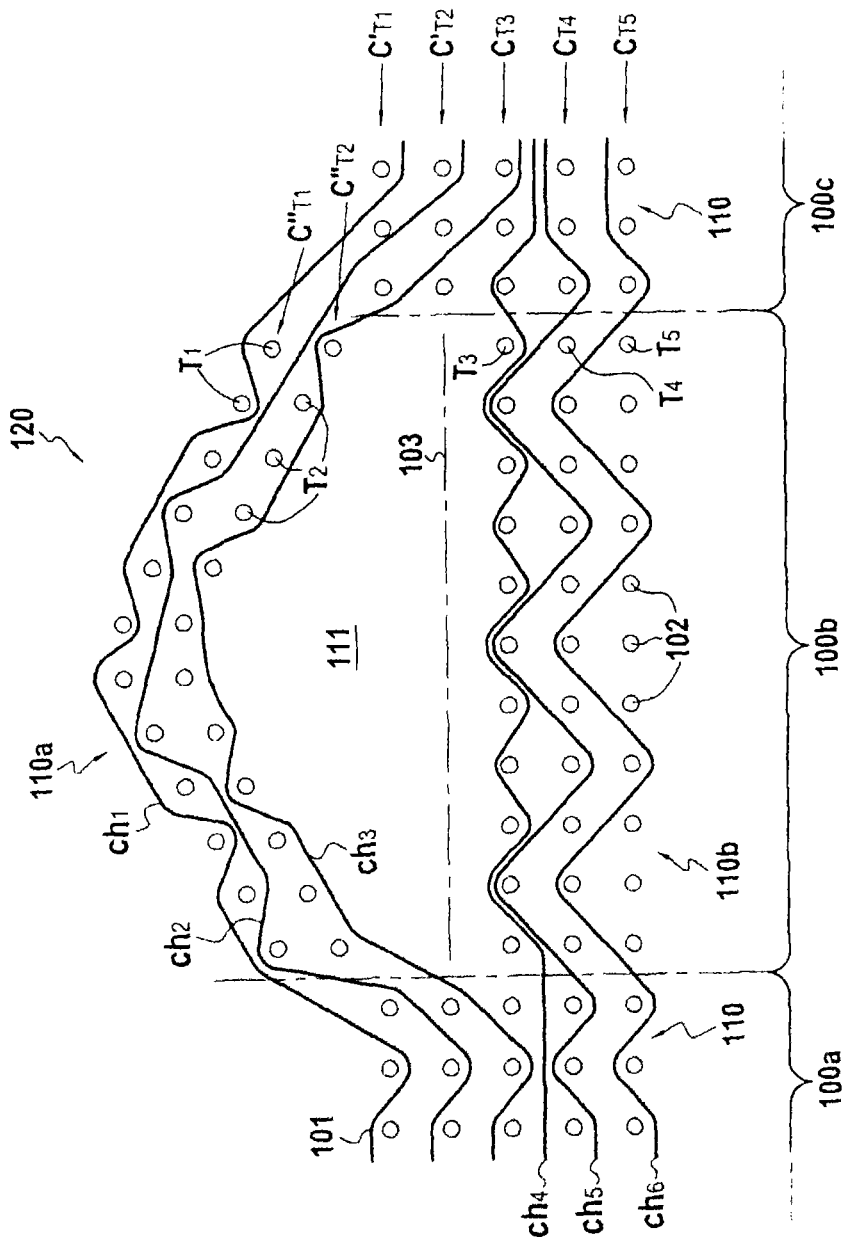

FIBROUS STRUCTURE FOR A PART MADE OF COMPOSITE MATERIAL HAVING ONE OR MORE ARCHSHAPED PORTIONS

BACKGROUND OF THE INVENTION

The present invention relates to making composite material parts, and more particularly to making fiber reinforcing structures for such parts.

The field of application of the invention is more particularly that of making parts out of structural composite material, i.e. parts having a fiber reinforcing structure that is densified with a matrix. Composite materials make it possible to make parts of overall weight that is lighter than the weight which the same parts would have if they were made of metal.

Parts of standard shapes made out of composite material generally present good structural characteristics and high strength, in particular because the fiber reinforcement of the part is usually made as a single piece and thus enables the mechanical forces acting on any portion of the part to be well distributed.

In contrast, when making composite material parts that are more complex in shape, and in particular parts having one or more elements for supporting the part as a whole, it is generally not possible to have high mechanical strength over the entire part.

By way of example, when using a composite material to make an aeroengine casing that has one or more suspension yokes for attaching the engine to the wing of an airplane, the fiber reinforcement in the suspension yoke(s) is fabricated independently of the fiber reinforcement of the casing shroud and is subsequently added thereto, e.g. by stitching or by adhesive. Because of the very great mechanical stresses (several thousands of tons) that act on engine-support yokes, such a casing design cannot provide sufficient mechanical strength. Consequently, that type of part is presently always made out of metal and consequently presents relatively high overall weight.

OBJECT AND SUMMARY OF THE INVENTION

It is therefore desirable to be able to have parts of complex shape that present reduced overall weight, while still having the required mechanical properties.

To this end, the invention provides a composite material part comprising fiber reinforcement densified by a matrix, the part having at least one element of arcuate shape, said reinforcement being constituted by a reinforcing fiber structure for the composite material part, said structure being woven as a single piece by multilayer weaving between a plurality of layers of weft yarns and a plurality of layers of warp yarns arranged in adjacent manner between two faces of said structure, the composite material part being characterized in that the fiber structure has at least one arcuate portion extending over one of the faces of said fiber structure, the arcuate portion comprising at least some of the warp yarns continuous with at least two adjacent warp yarn layers present on one of the faces of the structure, the warp yarns of said arcuate portion being of a length that is longer than the warp yarns of at least two underlying warp yarn layers of said structure, and in that said warp yarns of said arcuate portion are not interlinked with other warp yarns of the fiber structure.

It is thus possible to form composite material parts that include suspension or attachment elements that are formed from the arcuate portion(s). Since the arcuate portion(s) are woven from warp yarns that are continuous with the remainder of the fiber structure, the forces acting on the suspension or attachment elements of the part can be taken up by the overall structure of the part.

In various embodiments of the invention, the fiber structure has a plurality of arcuate portions arranged in adjacent manner in the weft direction and/or a plurality of arcuate portions offset from one another in the warp direction, with this applying to one or both faces of said fiber structure.

According to a characteristic of the invention, the fiber structure is in the form of a strip extending over a determined length in the warp direction and presenting a determined width in the weft direction, each arcuate portion extending over a length in the warp direction that is less than the length of the fiber structure and presenting a width in the weft direction that is less than the width of said structure. In a variant embodiment, the arcuate portion(s) may present width in the weft direction that is equal to the width of the strip of the fiber structure.

In an aspect of the invention, each arcuate portion presents a thread count in the warp direction that is substantially identical to the thread count of the portion of the fiber structure that is situated under the arcuate portion.

In another aspect of the invention, each arcuate portion presents a thread count in the warp direction that is less than that of the portion of the fiber structure situated under the arcuate portion.

In yet another aspect of the invention, each arcuate portion may comprise weft yarns of weight that is greater than the weight of the weft yarns of a portion of the fiber structure situated under the arcuate portion.

The composite material part of the invention may in particular constitute an aeroengine casing having at least one suspension yoke.

The invention also provides a turboprop fitted with an engine casing of the invention.

The invention also provides an aircraft fitted with at least one turboprop of the invention.

BRIEF DESCRIPTION OF THE DRAWINGS

Other characteristics and advantages of the invention appear from the following description of particular embodiments given as non-limiting examples and with reference to the accompanying drawings, in which:

FIGS. 3I to 3L are warp-section views on an enlarged scale showing a plurality of successive weaves planes in a portion of the FIG. 1 fiber blank including the arcuate portion;

DETAILED DESCRIPTION OF EMBODIMENTS

The invention applies in general to making fiber structures suitable for constituting fiber reinforcement or preforms for fabricating composite material parts that include at least one element of arcuate shape.

Figure 1:
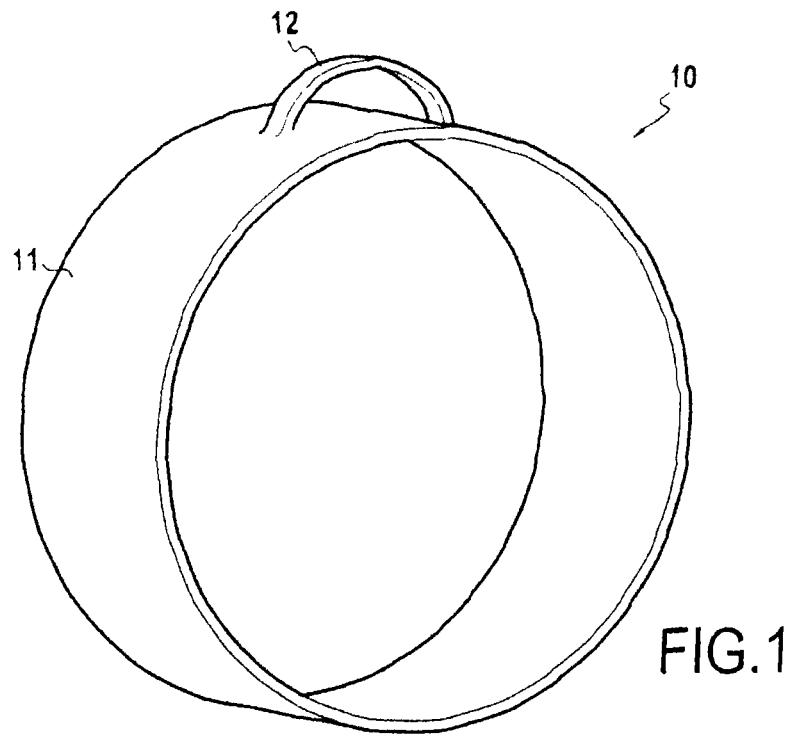
FIG. 1 is a perspective view of an aeroengine casing in accordance with an embodiment of the invention.

In accordance with the invention, the portion of the fiber structure that is to form the element of arcuate shape is made integrally with the remainder of the fiber structure. More precisely, and as explained in detail below, the portion that is to form the element of arcuate shape is woven from warp yarns that are continuous with the remainder of the structure. Thus, forces exerted on the element of arcuate shape can be taken up by the fiber structure as a whole that makes up the reinforcement for the composite material part. FIG. 1 shows a casing 10 of an aeroengine made of composite material forming a shroud 11 having a suspension yoke 12 for enabling the engine to be attached to an airplane wing pylon (not shown in FIG. 1).

Figure 2:
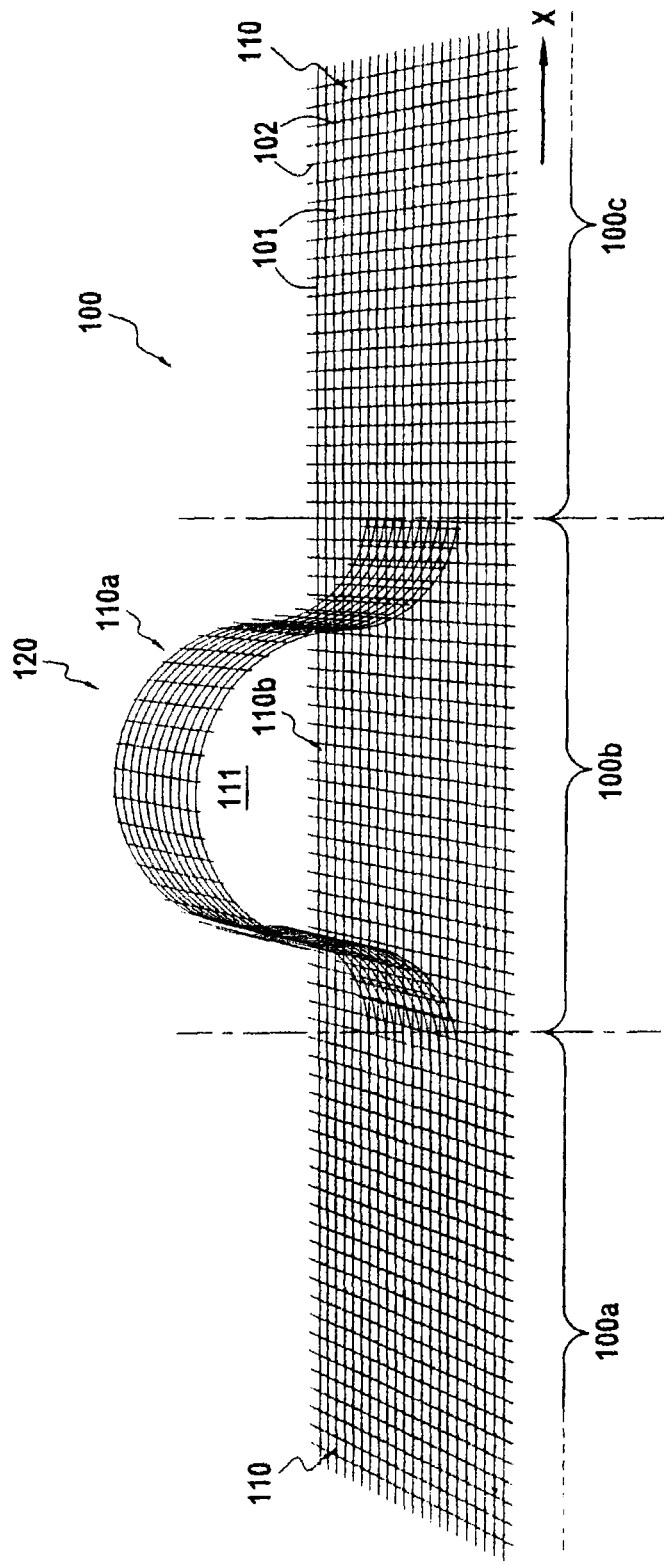
FIG. 2 is a diagrammatic perspective view of a fiber structure for fabricating a FIG. 1 aeroengine casing.

FIG. 2 is a very diagrammatic view of a fiber blank 100 for forming the fiber preform of the casing 10.

As shown diagrammatically in FIG. 2, the fiber blank 100 is obtained by multilayer weaving performed in known manner by means of a Jacquard type loom having a bundle of warp yarns 101 or strands making up a plurality of layers, the warp yarns being interlinked by weft yarns 102.

In the example shown, the multilayer weaving is weaving with an "interlock" weave. The term "interlock" is used herein to designate a weave in which each layer of weft yarns interlinks a plurality of layers of warp yarns, with all of the yarns in a given weft column having the same movement in the weave plane.

Other known types of multilayer weaving could be used, such as in particular those described in document WO 2006/136755, the content of which is incorporated herein by way of reference.

In particular, but non-exclusive manner, the fiber blank of the invention may be woven by using fiber yarns made of carbon, of ceramic such as silicon carbide fibers, or indeed of metal such as titanium.

As shown in FIG. 2, the fiber blank 100 is in the form of a strip 110 extending lengthwise in a direction X, the strip being intended, once the blank has been shaped, to form the shroud 11 of the casing 10, there being an arcuate portion 120 that is to form a suspension yoke 12 present on the fiber blank.

In portions 100a and 100c of the fiber blank 100 that are situated on either side of the portion 100b that includes the arcuate portion 120, all of the layers of warp yarns comprise warp yarns of the same length, and weft yarns are used to interlink each of the layers of warp yarns at least with the adjacent layer(s) of warp yarns so as to obtain a structure in the portions 100a and 100c of the blank in which all of the layers of warp yarns are interlinked.

In the portion 100b, the strip 110 is subdivided into two substrips 110a and 110b by a zone 111 of non-interlinking formed between a first group 101a of warp yarn layers and a second group 101b of warp yarn layers. The substrip 110a is made up of at least two adjacent or successive warp yarn layers taken from the first layer of warp yarns present on one face of the fiber blank 100, the top face in this example, while the substrip 110b is made up of the warp yarn layers underlying the layers of the substrip 110a. In accordance with the invention, the warp yarns of the substrip 110a are greater in length than the yarns of the underlying warp yarn layers of the substrip 110b. This difference in length may be obtained by applying a draw speed to the warp yarns of the warp yarn layers of the substrip 110a that is faster than the draw speed applied to the warp yarns of the warp yarn layers of the substrip 110b. In a variant implementation, the length of the warp yarns of the warp yarn layers of the substrip 110a may be increased relative to the length of the warp yarns of the substrip 110b by pulling on the warp yarns of the warp yarn layers of the substrip 110a.

FIGS. 3A to 3D are diagrams showing one way of performing multilayer weaving with an interlock weave in the portions 100a or 100c of the blank 100, with these figures being respective fragmentary views on an enlarged scale of successive warp section planes. In this example, the blank 100 comprises six layers of warp yarns 101 extending in the direction X. In FIGS. 3A to 3D, the six layers $C_1$ to $C_6$ of warp yarns are interlinked by weft yarns $T_1$ to $T_5$. For simplification purposes, only six layers of warp yarns and five layers of weft yarns are shown, naturally extending along the width and thickness dimensions of the fiber structure that is to be obtained, which structure may, in fact, be made with some numbers of warp and weft yarn layers and with some numbers of yarns per layer that are much greater.

FIGS. 3E to 3H are respective enlarged fragmentary views in successive warp section planes of a weave for the portion 100b of the blank 100 that includes the substrip 110a having both the arcuate portion 120 and the substrip 110b. In the portion 100b, the weft yarns $T_3$ do not interlink the warp yarn layers $C_3$ and $C_4$ so that the blank 100 presents non-interlinking 103 between the substrips 110a and 110b forming the zone 111 of non-interlinking. FIGS. 3E to 3H correspond to successive weave planes situated in the rising portion of the arcuate portion 120.

Figure 3A:
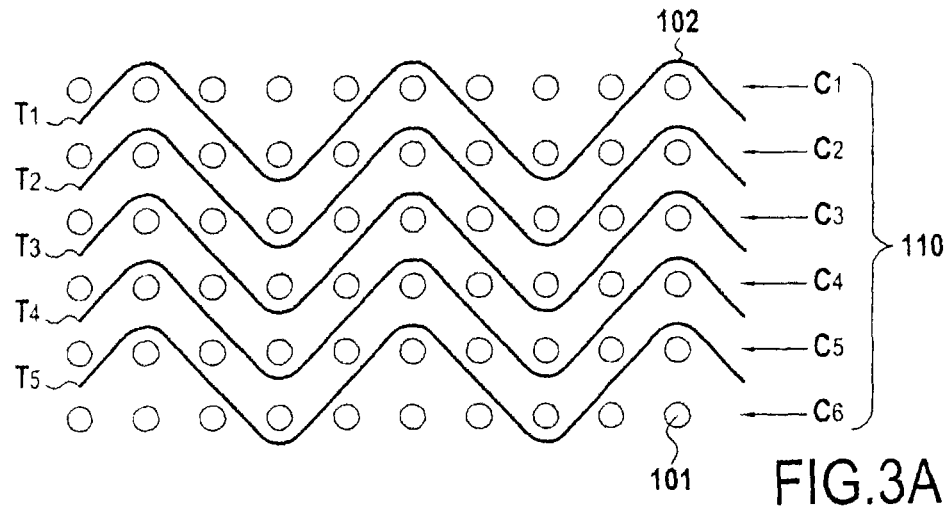
FIGS. 3A to 3D are weft-section views on an enlarged scale showing an example arrangement of weft yarns in a portion of the FIG. 1 fiber blank that does not include the arcuate portion.
Figure 3B:
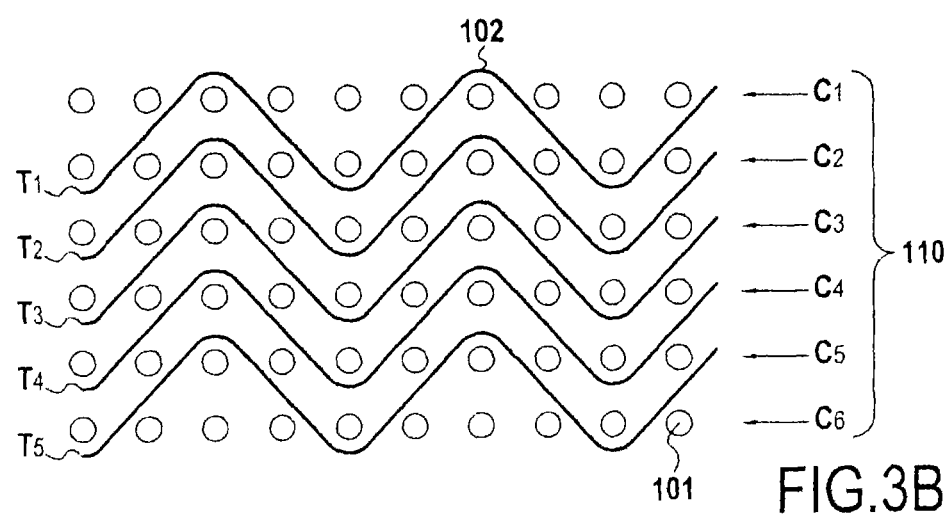
Figure 3C:
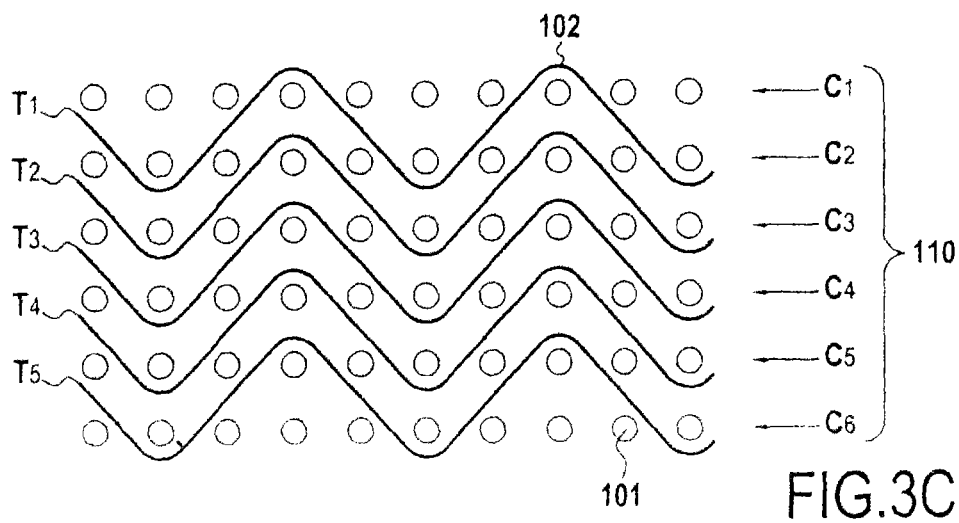
Figure 3D:
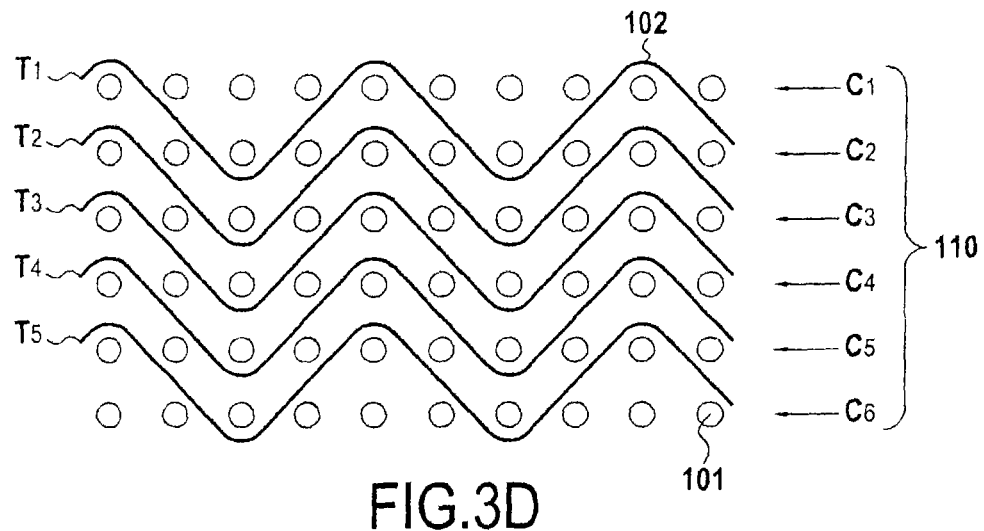
Figure 3E:
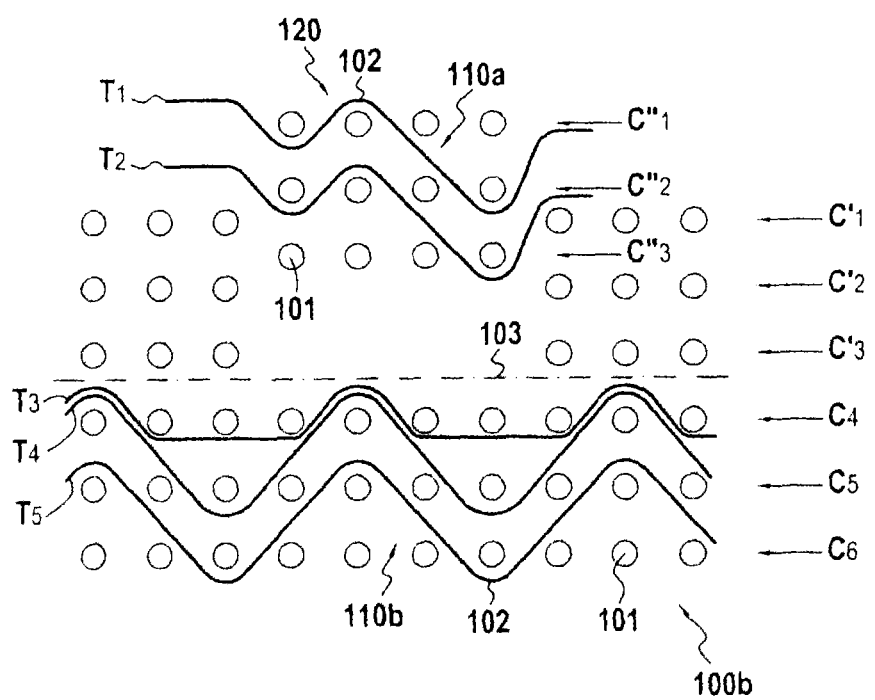
FIGS. 3E to 3H are weft-section views on an enlarged scale showing a plurality of successive weave planes in a portion of the FIG. 1 blank including the arcuate portion.

In FIG. 3E, layers $C''_1$, $C''_2$, and $C''_3$, which correspond to respective fractions of the warp yarns in the three warp yarn layers $C_1$, $C_2$, and $C_3$ that are for use in forming the arcuate portion 120, are interlinked with one another by weft yarns $T_1$ and $T_2$, while the layers $C'_1$, $C'_2$, and $C'_3$, which correspond to the remaining warp yarns in the three warp yarn layers $C_1$, $C_2$, and $C_3$, are not woven. The three underlying warp yarn layers $C_4$, $C_5$, and $C_6$ are interlinked by the weft yarns $T_3$, $T_4$, and $T_5$.

Figure 3F:
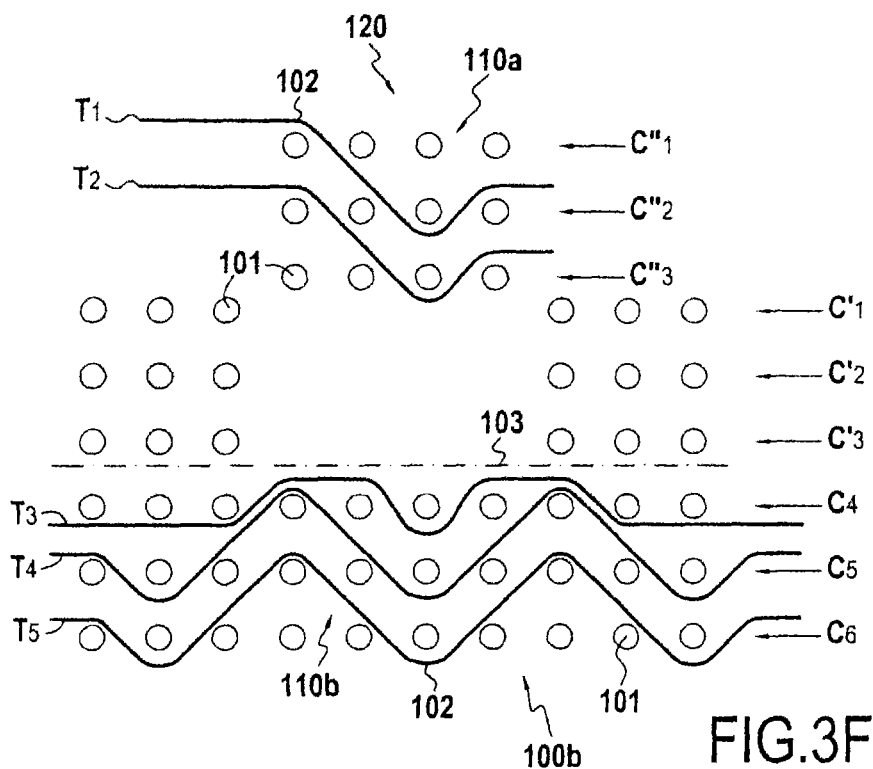
Figure 3G:
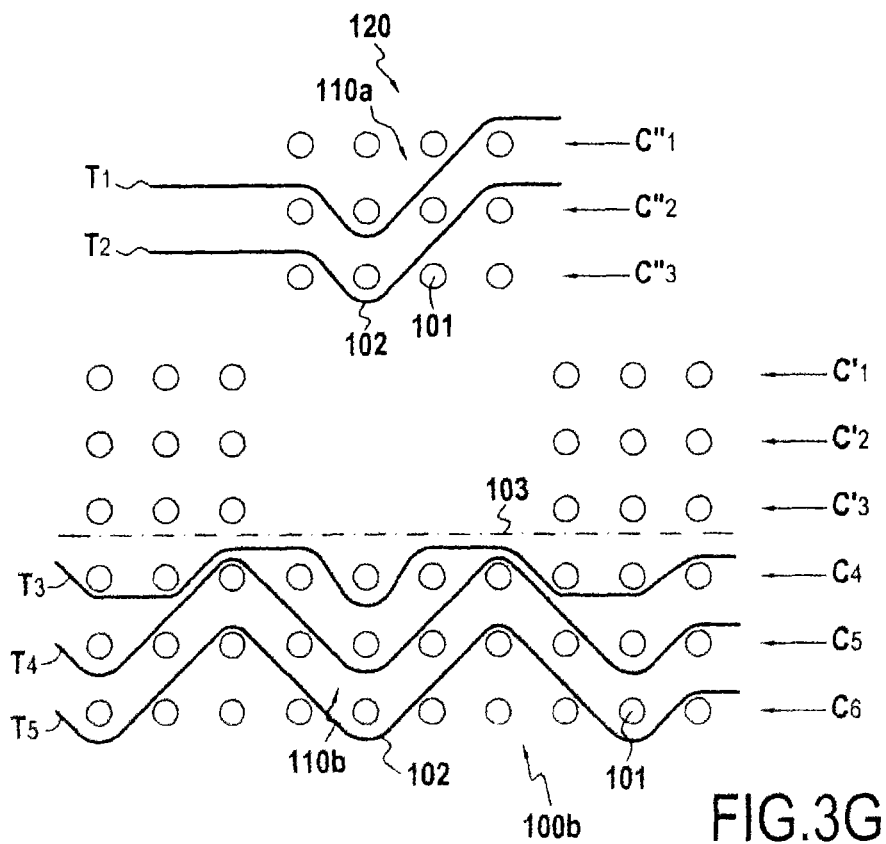
Figure 3H:
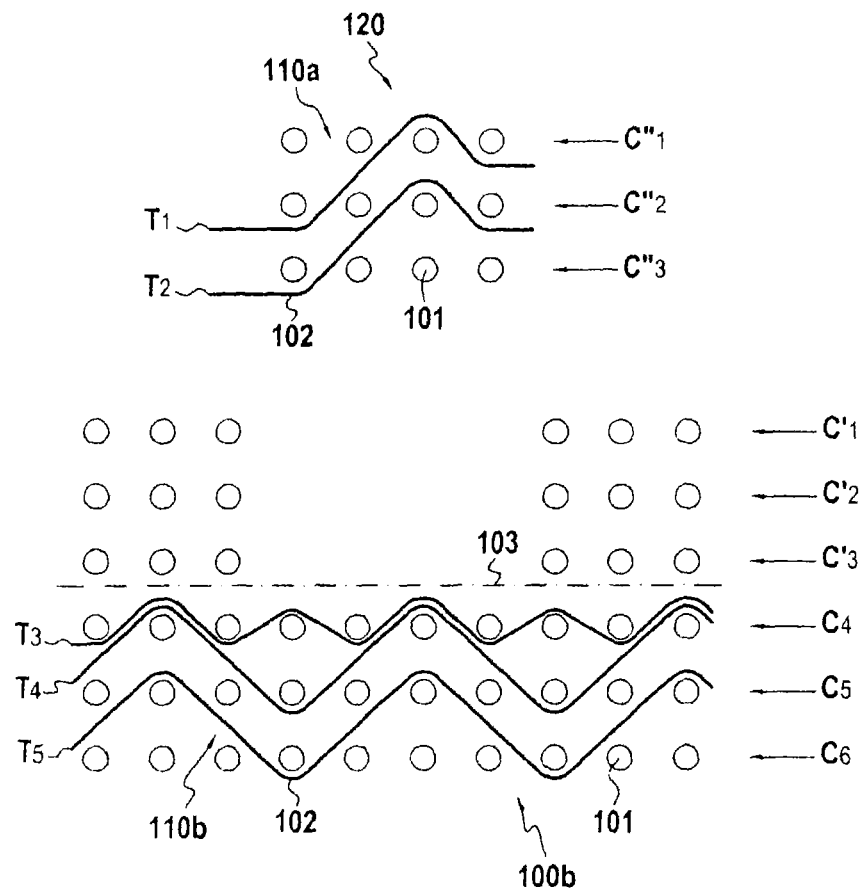
Figure 3I:
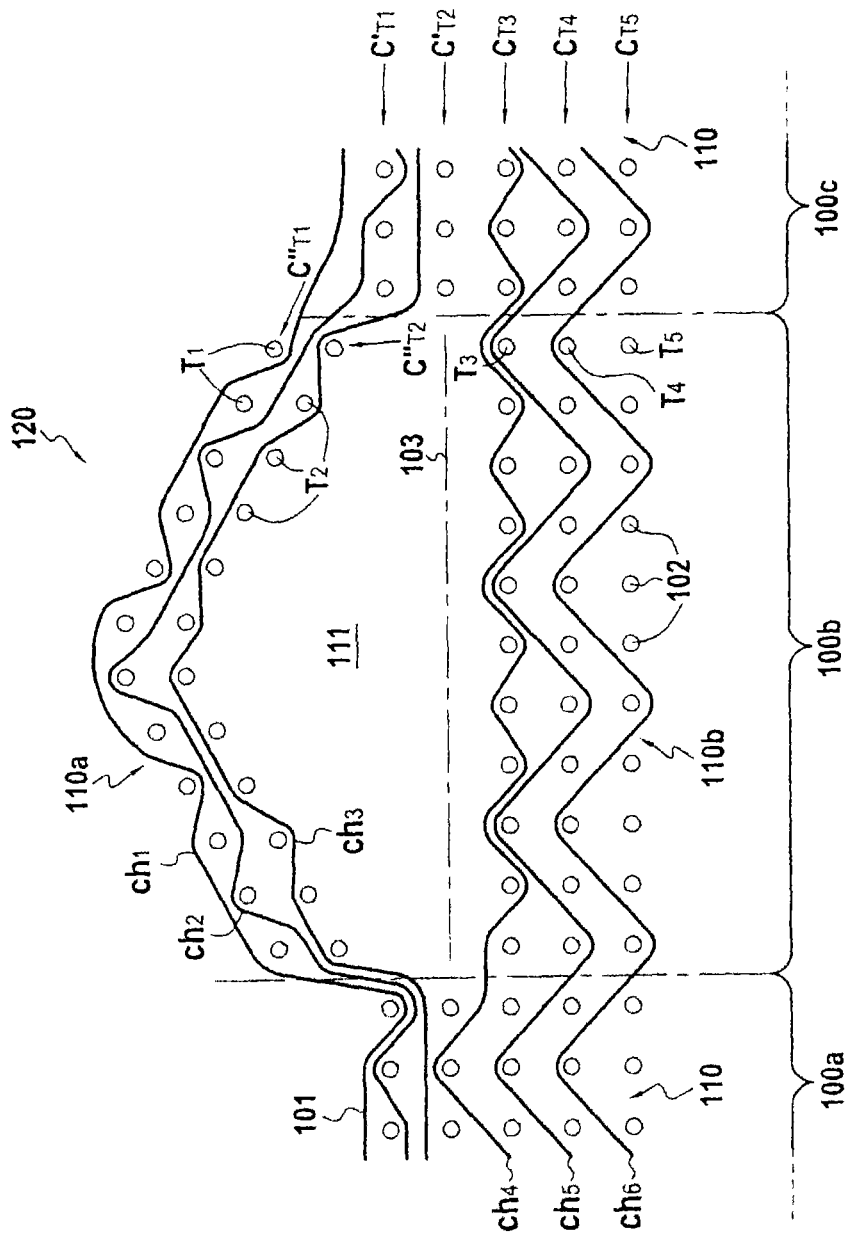
Figure 3J:
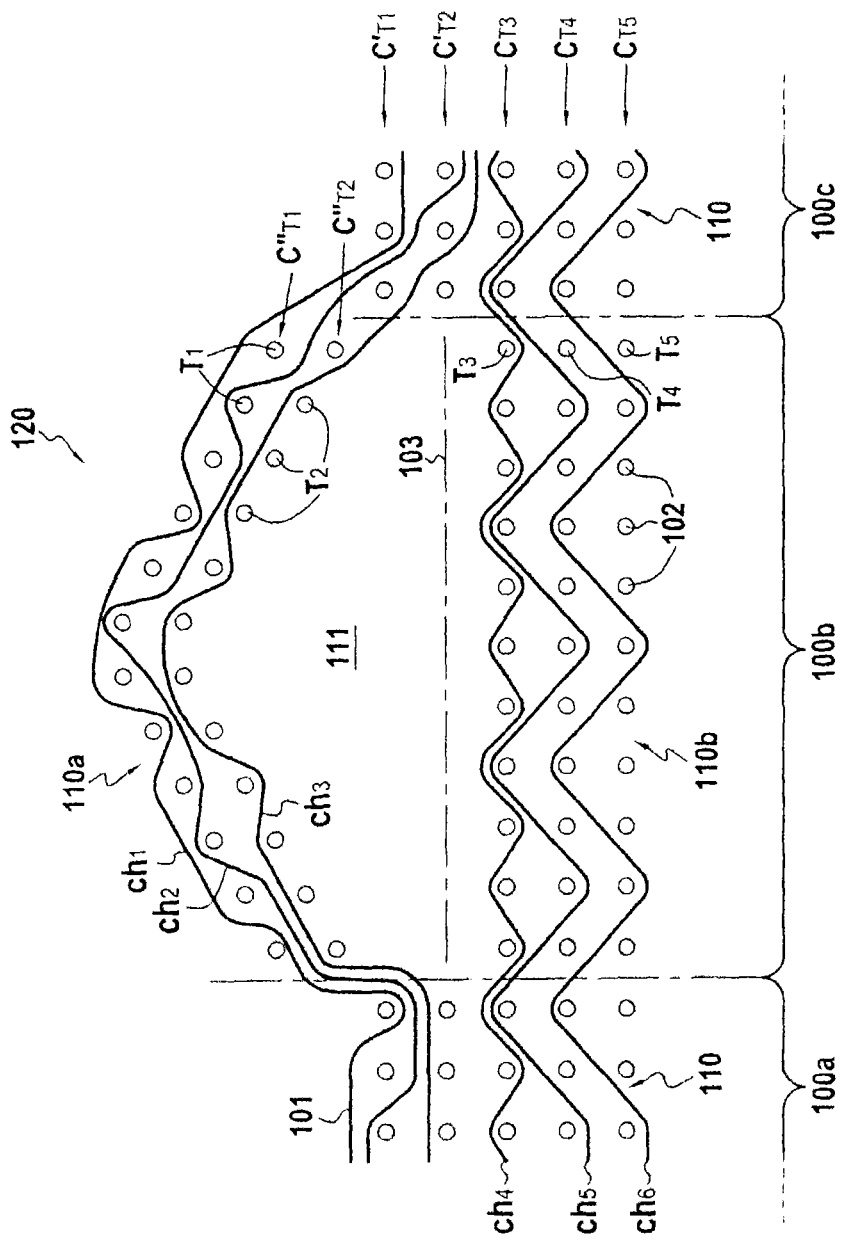
Figure 3K:
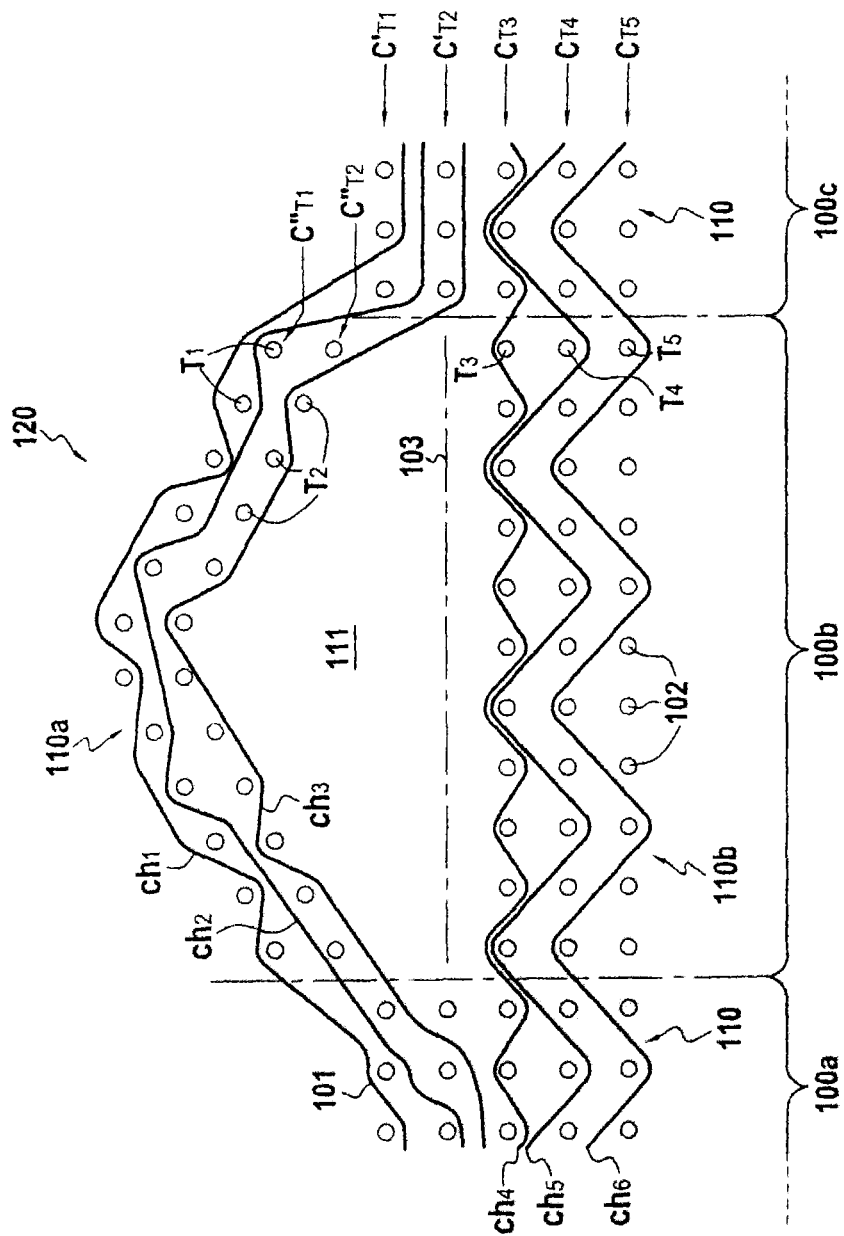

FIGS. 3F, 3G, and 3H show respectively the three successive weave planes that are made following the weave plane of FIG. 3E. The weave planes of FIGS. 3E to 3H are repeated over the entire length of the arcuate portion 120.

FIGS. 3I to 3L are respective enlarged fragmentary views of successive weft section planes of a weave of the blank 100 including the portion 100b. In the portion 100b, the weft yarns of the two weft yarn layers $C''_{T1}$, and $C''_{T2}$ and belonging to the substrip 110a are woven with the warp yarns $ch_1$, $ch_2$, and $ch_3$ of the warp yarn layers $C''_1$, $C''_2$, and $C''_3$ (FIGS. 3E to 3H), while the other weft yarns of the underlying weft yarn layers $CT_3$, $CT_4$, and $CT_5$ that form part of the substrip 110b are woven with the warp yarns $ch_4$, $ch_5$, and $ch_6$ of the warp yarn layers $C_4$, $C_5$, and $C_6$ (FIGS. 3E to 3H).

As shown in FIGS. 3I to 3L, in the portion 100b, the number of weft yarns $T_1$ and $T_2$ present respectively in the layers $C''_{T1}$ and $C''_{T2}$ is greater than the number of weft yarns $T_3$, $T_4$, and $T_5$ present respectively in the layers $C_{T3}$, $C_{T4}$, and $C_{T5}$. This serves to maintain a constant thread count in the substrip 110a relative to the substrip 110b and to the remainder of the blank 100, i.e. the number of weft yarns per unit length in the warp direction is constant between the two substrips 110a and 110b, with this applying in spite of the greater length of the warp yarns in the substrip 110a. If the same number of weft yarns are inserted in the substrips 110a and 110b, then the pitch between two adjacent weft yarns in the warp direction in the substrip 110a may be reduced by inserting weft yarns that are heavier than the weft yarns inserted in the substrip 110b.

The thread count in the substrip 110a may also be smaller (or looser) than in the substrip 110b, i.e. the number of weft yarns per unit length in the warp direction is less in the substrip 110a than in the substrip 110b.

At the end of weaving, the non-woven warp yarns, i.e. in this example the warp yarns of the layers $C'_1$, $C'_2$, and $C'_3$ (FIGS. 3E to 3H) and the non-woven weft yarns, i.e. the portions of the weft yarns $T_1$ and $T_2$ situated outside the layers $C''_1$, $C''_2$, and $C''_3$ are cut off in order to extract the blank 100 as shown in FIG. 2, which shows the blank as it results from the multilayer weaving and before any shaping. In a variant embodiment, the arcuate portion may also be cut using a water jet, e.g. in order to reduce its thickness and/or modify its width profile in the weft direction.

The extra length of the warp yarns in the substrip 110a in the portion 100b, and the zone 111 of non-interlinking that is organized during weaving between the substrips 110a and 110b, together make it possible to form the arcuate portion 120.

The arcuate portion of the fiber structure of the invention is made up of a plurality of warp yarn layers that are interlinked. Relative to the remainder of the underlying strip, this portion defines a cavity that is conserved in the final part, i.e. after the texture has been densified with the matrix.

Figure 4:
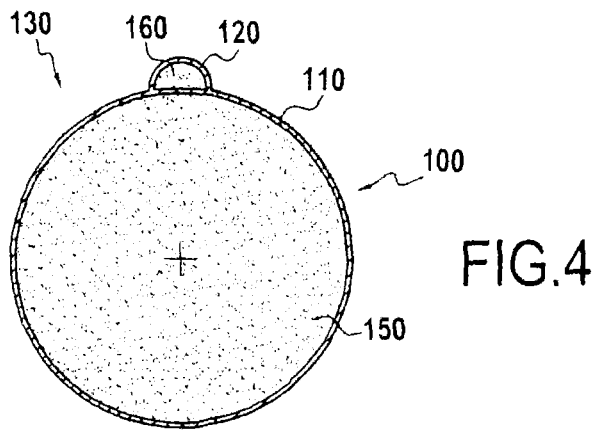
FIG. 4 shows the shaping of the FIG. 2 fiber structure in preparation for densification.
Figure 5A:
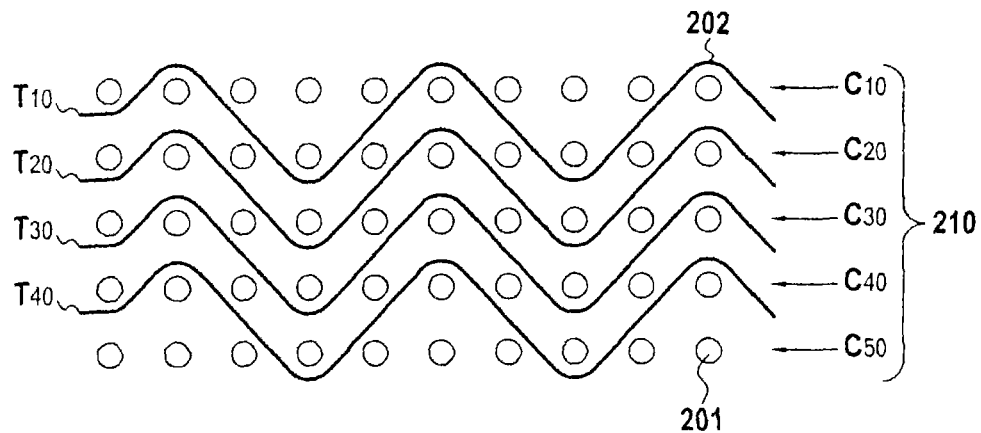
FIGS. 5A to 5D are weft-section views on an enlarged scale showing a plurality of successive weave planes in the portion of the fiber blank that does not include the arcuate portion.
Figure 5B:
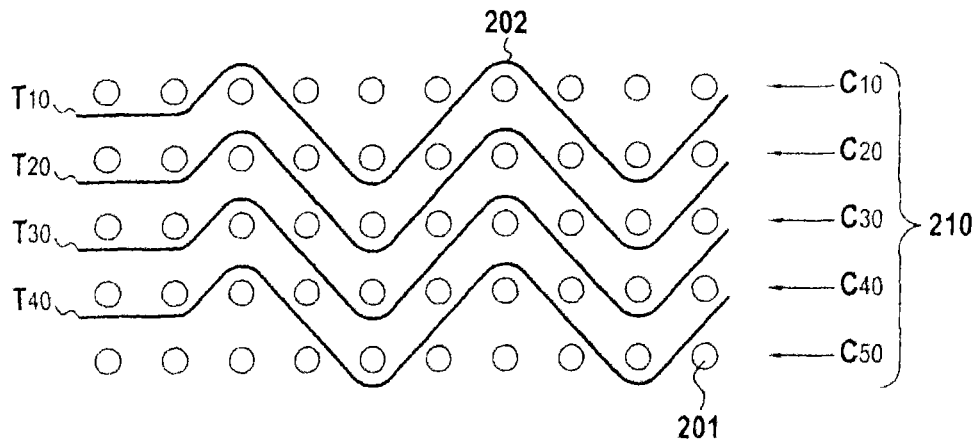
Figure 5C:
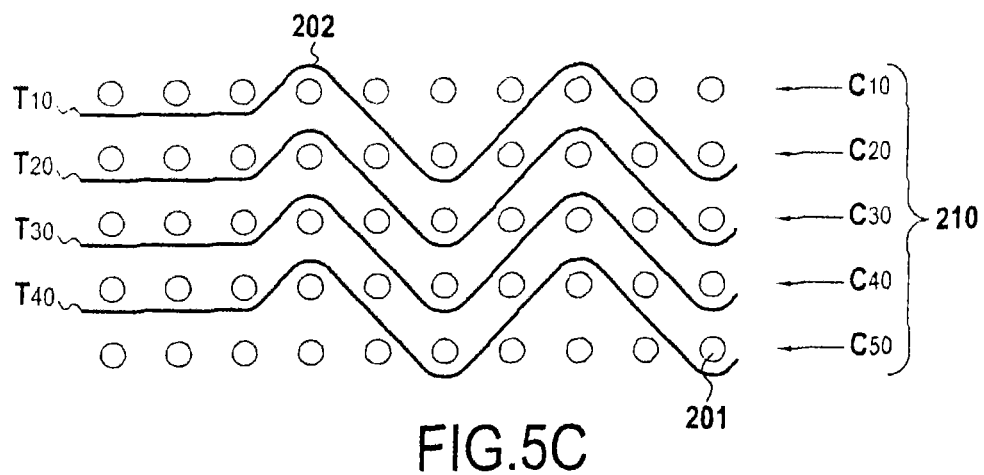
Figure 5D:
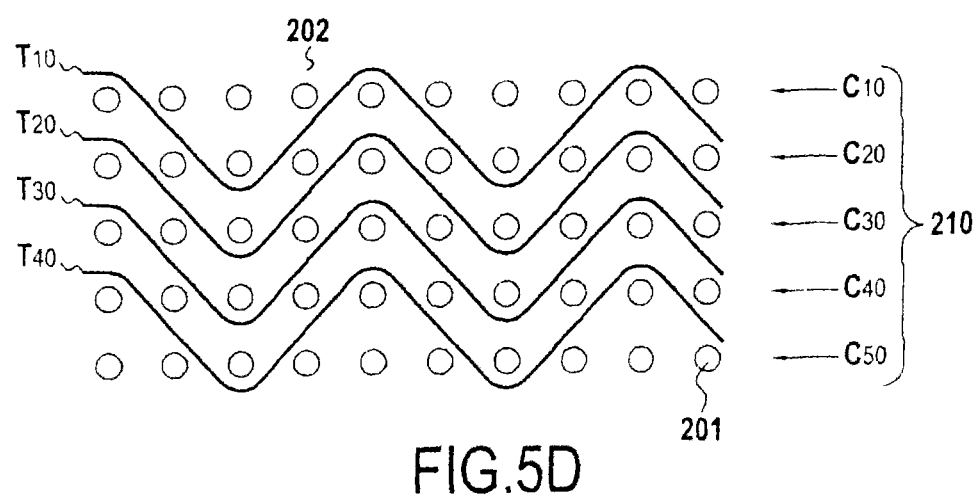
Figure 5E:
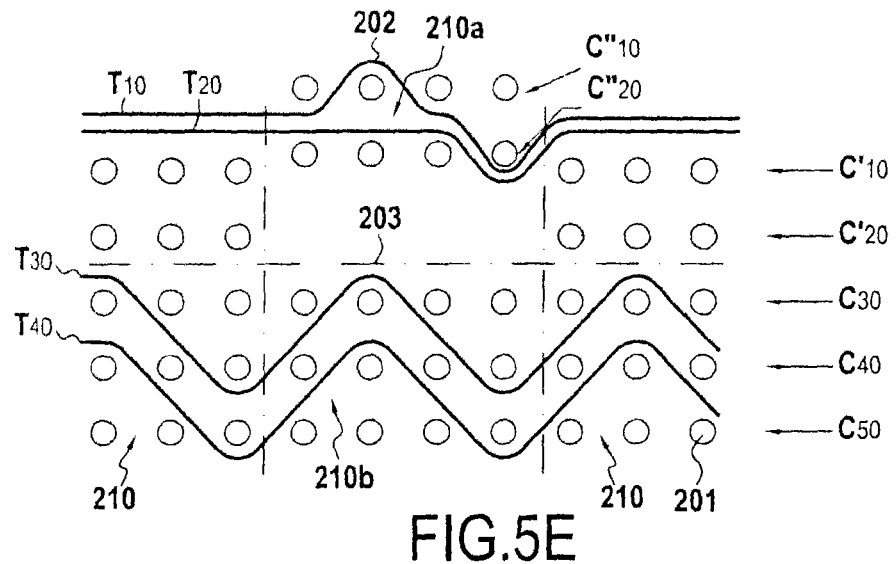
FIGS. 5E to 5H are weft-section views on an enlarged scale showing a plurality of successive weave planes in a portion of the fiber blank including an arcuate portion.
Figure 5F:
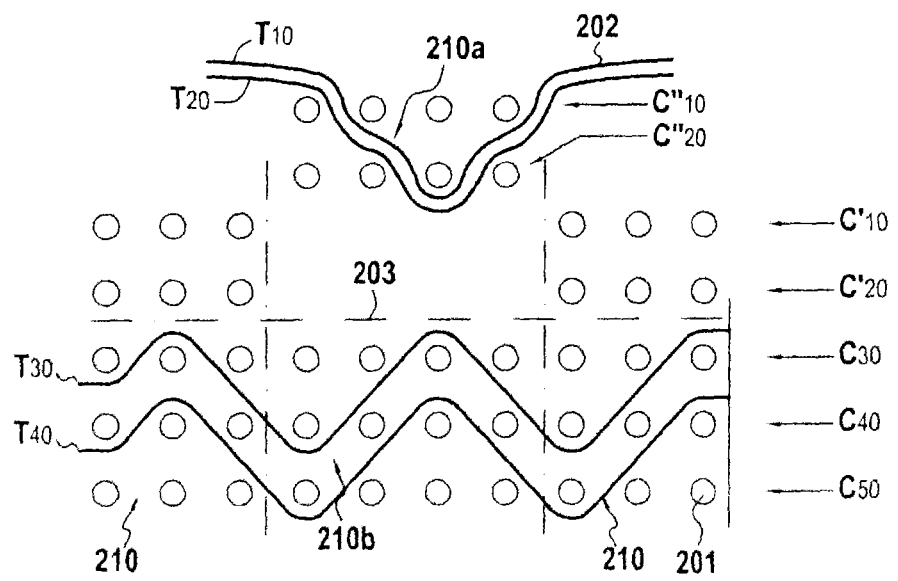
Figure 5G:
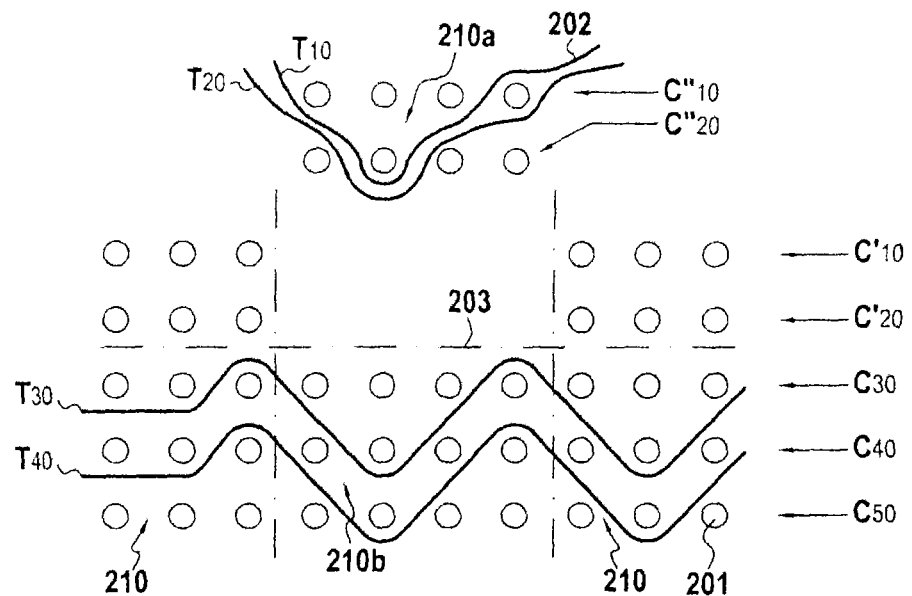
Figure 5H:
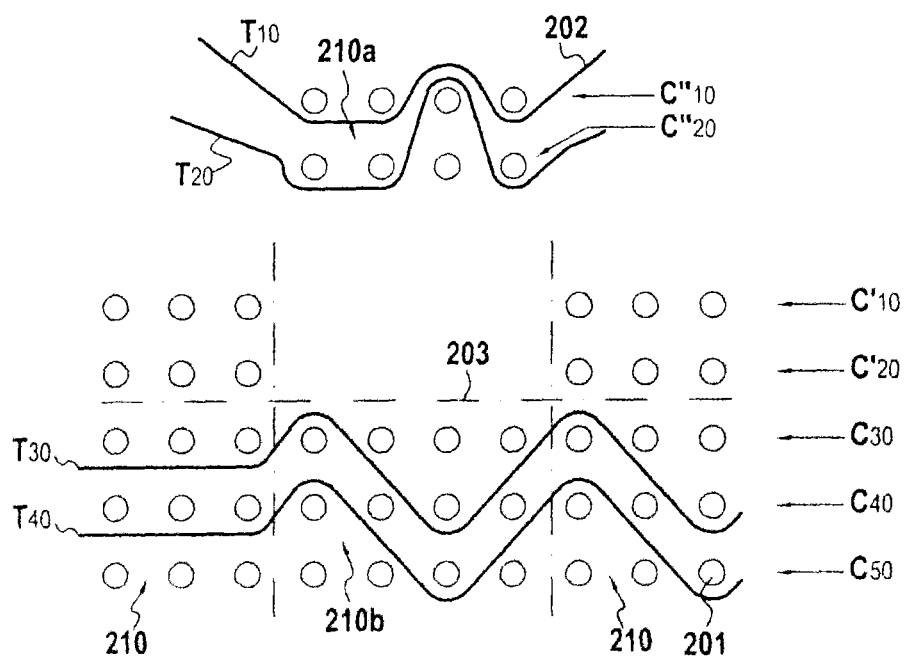

Thereafter, the fiber blank is densified in order to form the casing 10 of FIG. 1. For this purpose, and as shown in FIG. 4, the fiber blank 100 is shaped around a mandrel 150 and by way of example the two free ends of the blank 100 may be sewn together prior to said densification or they may merely be superposed, with the ends being bonded together during densification. This produces a fiber preform 130 ready for being densified. An insert 160 corresponding to the inside shape of the arcuate portion 120 is also placed therein so as to keep the arcuate portion in shape during densification and prevent a matrix being formed in the volume present between the arcuate portion 120 and the bottom strip of the blank. In variant embodiments, the fiber blank presents a length corresponding to several times the circumference of the casing, and the arcuate portion may be situated on the portion of the blank that is placed on the mandrel during the last turn, or conversely, during the initial turn or turns, with openings allowing the arcuate portion to pass through the following turns then being provided in the blank.

Densification of the fiber preform consists in filling in the pores of the preform, in all or in part of its volume, by using the material that constitutes the matrix.

The matrix of the composite material constituting the streamlined structure may be obtained in known manner using the liquid technique.

The liquid technique consists in impregnating the preform with a liquid composition containing an organic precursor for the material of the matrix. The organic precursor is usually in the form of a polymer, such as a resin, possibly diluted in a solvent. The preform is placed in a mold that may be closed in leaktight manner and that has a cavity with the shape of the molded finished part. In this example, the preform is placed between a mold and a countermold respectively having the outside shape and the inside shape (such as the mandrel 150) of the casing that is to be made. Thereafter, the mold is closed and the liquid matrix precursor (e.g. a resin) is injected into the entire mold cavity to impregnate all of the fiber portion of the preform.

The precursor is transformed into an organic matrix, i.e. it is polymerized, by applying heat treatment, generally by heating the mold after eliminating any solvent and after curing the polymer, the preform continuing to be held inside the mold and thus having the shape of the part that is to be made. The organic matrix may be obtained in particular from epoxy resins, e.g. such as commercially-available high-performance epoxy resin or liquid precursors for carbon or ceramic matrices.

When forming a carbon or ceramic matrix, the heat treatment consists in pyrolyzing the organic precursor in order to transform the organic matrix into a carbon or ceramic matrix depending on the precursor used and on pyrolysis conditions. By way of example, liquid precursors of carbon may be resins having a high coke content, such as phenolic resins, whereas liquid precursors of ceramic, and in particular of SiC, may be resins of the polycarbosilane (PCS) or polytitanocarbosilane (PTCS), or polysilazane (PSZ) type. Several consecutive cycles going from impregnation to heat treatment may be performed in order reach the degree of densification that is desired.

In an aspect of the invention, the fiber preform may be densified by the well-known resin transfer molding (RTM) method. In the RTM method, the fiber preform 130 together with the mandrel 150 and the insert 160 (FIG. 4) is placed in a mold presenting the outside shape of the casing that is to be made. A thermosetting resin is injected into the inside space defined between the rigid material part and the mold and that contains the fiber preform. A pressurize gradient is generally established within this inside space between the location where the resin is injected and resin discharge orifices in order to control and optimize the impregnation of the preform with the resin.

By way of example, the resin used may be an epoxy resin. Resins suitable for RTM methods are well known. They preferably present low viscosity in order to make them easier to inject among the fibers. The temperature class and/or the chemical nature of the resin is/are determined as a function of the thermomechanical stress to which the part is to be subjected. Once the resin has been injected throughout the reinforcement, it is polymerized by heat treatment in accordance with the RTM method.

After injection and polymerization, the part is unmolded. The part is finally trimmed in order to remove excess resin and chamfers are machined in order to machine the casing 10 of FIG. 1.

FIGS. 5A to 5H are enlarged fragmentary diagrammatic views in successive warp section planes showing a variant of the interlock weave for multilayer weaving of a blank 200 in order to form an aeroengine casing similar to the casing 10 of FIG. 1, i.e. presenting a shroud with an arcuate suspension yoke incorporated therein. This weaving differs from that of FIGS. 3A to 3H in that only two layers of warp yarns are used to form an arcuate portion 220. In this example, the blank 200 has five layers $C_{10}$ to $C_{50}$ of warp yarns 201 that are interlinked by weft yarns 201 referenced $T_{10}$ to $T_{40}$ in FIGS. 5A to 5D, with the blank forming a strip 210. In FIGS. 5E to 5H, which correspond to the portion of the fiber blank where the arcuate portion 220 of the fiber blank is formed, the weft yarns 220 do not interlink the warp yarn layers $C_{20}$ and $C_{30}$ so that the blank 200 presents non-interlinking 203 separating two substrips 210a and 210b. The substrip 210a corresponding to the arcuate portion 220 of the blank 200 has warp yarns of a length greater than that of the warp yarns of the substrip 210B. In FIGS. 5E to 5H, layers C"$_{10}$ and C"$_{20}$, which correspond to respective fractions of the warp yarns of two warp yarn layers C$_{10}$ and C$_{20}$ that are to form the arcuate portion 220, are interlinked by the weft yarns T$_{10}$ and T$_{20}$, while the layers C'$_{10}$ and C'$_{20}$, which correspond to the remaining warp yarns of the two warp yarn layers C$_{10}$ and C$_{20}$, are not woven. The three underlying warp yarns C$_{30}$, C$_{40}$, and C$_{50}$ are interlinked by the weft yarns T$_{30}$ and T$_{40}$. The weave patterns of FIGS. 5E to 5H are repeated over the entire length of the arcuate portion 220. The number of weft yarns inserted in the substrip 210a may be greater than the number of weft yarns inserted in the substrip 210b in order to maintain a constant thread count in the warp direction between these two substrips, in spite of the greater length of the warp yarns in the substrip 210a. It is also possible for the thread count in the warp direction to be smaller (or slacker) in the substrip 210a relative to the thread count in the warp direction in the substrip 210b, with the same number of weft yarns being inserted in both of the substrips 210a and 210b. If the same number of weft yarns are inserted in both of the substrips 210a and 210b, then the pitch between two adjacent weft yarns in the warp direction in the substrip 210a may be reduced by inserting weft yarns of weight that is greater than the weight of the weft yarns inserted in the substrip 210b.

Figure 6:
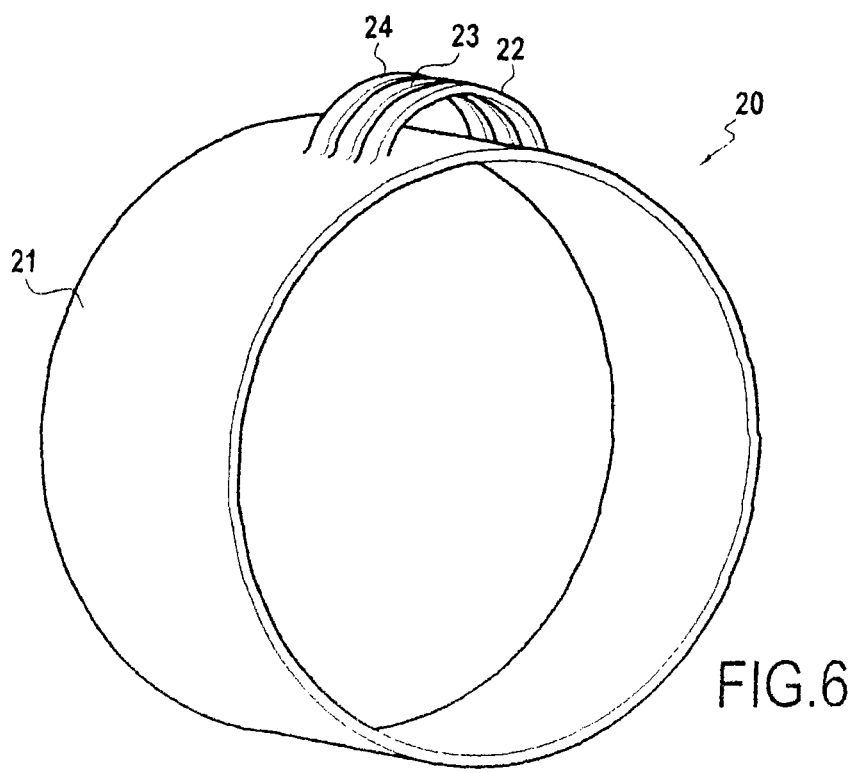
FIG. 6 is a perspective view of another embodiment of an aeroengine casing of the invention.

The invention is not limited to forming a part in the form of a body of revolution having a single element of arcuate shape. As non-limiting examples, FIGS. 6 to 10 show other types of part that may be made in accordance with the invention. FIG. 6 shows an aeroengine casing 20 that has a shroud 21 with three adjacent suspension yokes 22, 23, and 24 formed thereon in the width direction of the shroud. FIG. 10 shows an aeroengine casing 60 having a shroud 61 with three suspension yokes 62, 63, and 64 formed thereon that are distributed around the circumference of the shroud. Under such circumstances, when making the fiber structure of the invention, three arcuate portions are formed in the same manner as that described above for making the portions 120 and 220, these three arcuate portions being made by using warp yarns that are adjacent in the weft direction of the fiber blank, with the length of the warp yarns in these three arcuate portions naturally being longer than the length of the warp yarns in the underlying warp yarn layers and also than the warp yarns situated between two arcuate portions or outside them in the weft direction.

Figure 7:
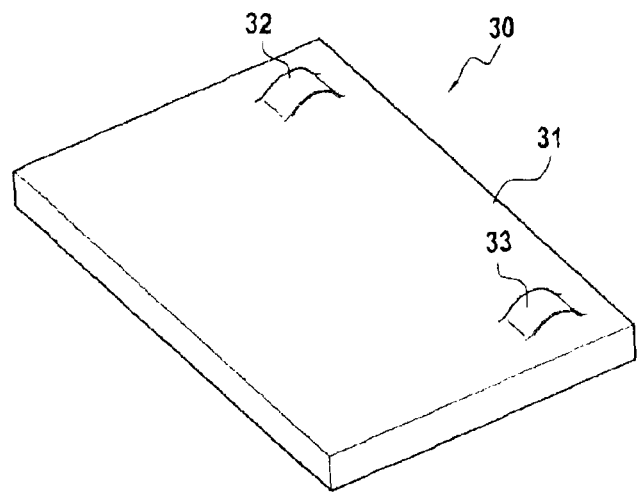
FIG. 7 is a perspective view of an embodiment of a door provided with a hinge of the invention.

FIG. 7 shows a door 30 comprising a panel 31 fitted with two hinges 32 and 33. In this example, when making the fiber structure of the invention, two arcuate portions are formed in the same manner as that described above for making the arcuate portions 120 and 220, these two arcuate portions being made by using warp yarns that are adjacent in the weft direction of the fiber blank, the warp yarns used for each of these two arcuate portions being situated in the vicinity of a respective edge of the blank in the weft direction. The length of the warp yarns in these two portions is naturally greater than the length of the warp yarns in the underlying warp yarn layers, and also than the length of the warp yarns situated between two arcuate portions or outside the arcuate portions in the weft direction.

Figure 8:
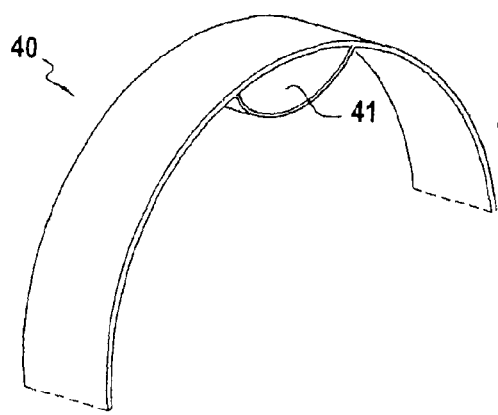
FIG. 8 is a perspective view of an embodiment of a shroud portion provided with an internal partition of the invention.

FIG. 8 shows a shroud portion 40 comprising an inner partition 41 that may be used for guiding wires or as a duct. This part is obtained by making a fiber structure that has an arcuate portion across its entire width in the weft direction of the fiber blank, this arcuate portion being formed in the same manner as that described above for making the portions 120 and 220, the fiber blank merely being densified while being held with curvature that is reversed relative to the blanks 100 and 200.

Figure 9:
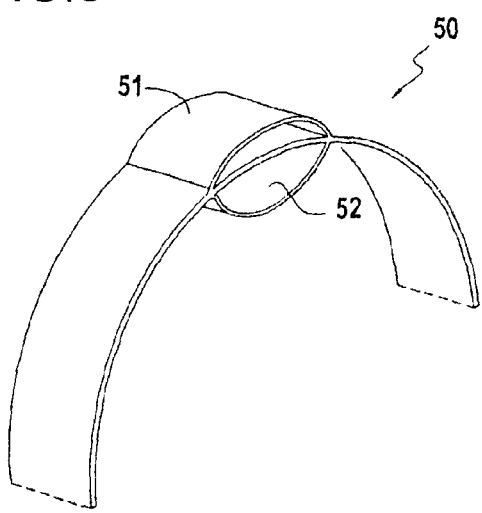
FIG. 9 is a perspective view of an embodiment of a shroud portion provided with an internal partition and with an external partition of the invention.
Figure 10:
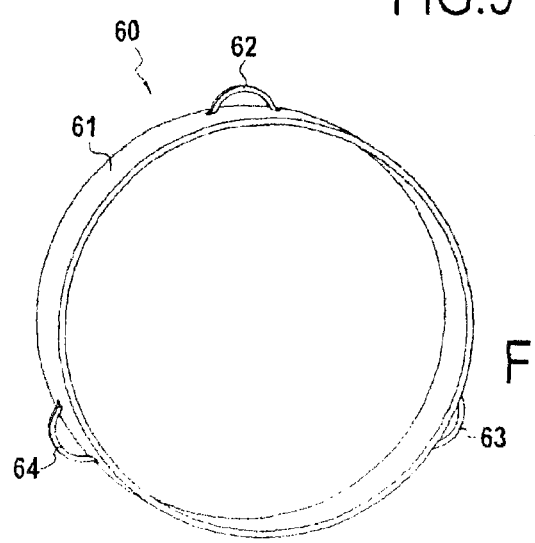
FIG. 10 is a perspective view of another embodiment of an aeroengine casing of the invention.

FIG. 9 shows a shroud portion 50 having an outer partition 51 arranged on an outside face 50a of the shroud portion and an inner partition 52 arranged on an inside face 50b of the shroud portion 50. In this example, the fiber structure from which the fiber reinforcement of the shroud portion 50 is made has a first arcuate portion extending over one of the faces of the fiber structure and a second arcuate portion extending over the other face of the fiber structure. The first and second arcuate portions are formed respectively with warp yarns of at least two adjacent warp yarn layers present on each of the faces of the fiber structure. These first and second arcuate portions are made in the same manner as that described above for making the portions 120 and 220, i.e. with warp yarns that are continuous with the remainder of the structure but that are of a length that is greater than the length of the warp yarns at least of the two underlying warp yarn layers of the structure, the warp yarns of each arcuate portion being non-interlinked with the other warp yarns of the fiber structure.

In accordance with the invention, the fiber reinforcement of the suspension yokes 22 to 24, of the hinges 32 and 33, of the inner partition 41, and of the inner and outer partitions 51 and 52 are all formed using warp yarns that are continuous with the fiber reinforcement of the remainder of the structure, i.e. the fiber reinforcement respectively of the shroud 21, of the panel 31, of the shroud portion 40, and of the shroud portion 50.

The shape and the dimensions of the composite material parts made with the fiber structure of the invention may be varied and need not be limited specifically to shroud-shaped or panel-shaped parts, but may apply to parts of any other shape on which one or more arcuate portions are to be made.

The invention claimed is:

1. A composite material part comprising:
   fiber reinforcement densified by a matrix;
   the reinforcement including a reinforcing fiber structure for the composite material part, the structure being woven as a single piece by multilayer weaving between a plurality of layers of weft yarns and a plurality of layers of warp yarns arranged in adjacent manner between two faces of the fiber structure;
   wherein the fiber structure includes at least one arcuate portion extending over one of the faces of the fiber structure, the arcuate portion comprising at least some of the warp yarns continuous with at least two adjacent warp yarn layers present on one of the faces of the fiber structure, the warp yarns of the arcuate portion being of a length that is longer than the warp yarns of at least two underlying warp yarn layers of the fiber structure, and the warp yarns of the arcuate portion are not interlinked with other warp yarns of the fiber structure.

2. A part according to claim 1, wherein the fiber structure includes a plurality of arcuate portions arranged in adjacent manner in the weft direction.

3. A part according to claim 1, wherein the fiber structure includes a plurality of arcuate portions offset from one another in the warp direction.

4. A part according to claim 1, wherein the fiber structure includes a plurality of arcuate portions arranged on the two faces of the fiber structure.

5. A part according to claim 1, wherein the fiber structure is in a form of a strip extending over a determined length in the warp direction and presenting a determined width in the weft direction, and each arcuate portion extends over a length in the warp direction that is less than the length of the structure and presents a width in the weft direction that is less than the width of the structure.

6. A part according to claim 1, wherein each arcuate portion presents a thread count in the warp direction that is substantially identical to a thread count of the portion of the fiber structure that is situated under the arcuate portion.

7. A part according to claim 1, wherein each arcuate portion presents a thread count in the warp direction that is less than that of a portion of the fiber structure situated under the arcuate portion.

8. A part according to claim 1, wherein each arcuate portion has weft yarns of weight that is greater than weight of the weft yarns of a portion of the fiber structure situated under the arcuate portion.

9. A part according to claim 1, constituting an aeroengine casing having at least one suspension yoke.

10. A turboprop comprising an engine casing according to claim 9.

11. An aircraft comprising at least one turboprop according to claim 10.

* * * * *